United States Patent
Chan et al.

(10) Patent No.: US 10,271,226 B2
(45) Date of Patent: Apr. 23, 2019

(54) ADAPTATION OF A NETWORK BASED ON A SUB-NETWORK DETERMINED ADAPTATION OF THE SUB-NETWORK

(71) Applicant: AT&T INTELLECTUAL PROPERTY I, L.P., Atlanta, GA (US)

(72) Inventors: Jesse Chan, Bothell, WA (US); David Kinsey, Carnation, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 88 days.

(21) Appl. No.: 15/462,785

(22) Filed: Mar. 17, 2017

(65) Prior Publication Data

US 2018/0270672 A1 Sep. 20, 2018

(51) Int. Cl.
  *H04W 8/04* (2009.01)
  *H04W 24/02* (2009.01)
  *H04L 12/24* (2006.01)

(52) U.S. Cl.
  CPC ......... *H04W 24/02* (2013.01); *H04L 41/0816* (2013.01); *H04L 41/0893* (2013.01); *H04L 41/147* (2013.01)

(58) Field of Classification Search
  CPC ............. H04L 41/0816; H04L 41/0893; H04L 41/147; H04W 8/04; H04W 24/02
  See application file for complete search history.

(56) References Cited

U.S. PATENT DOCUMENTS

| | | | |
|---|---|---|---|
| 7,453,906 B2 | 11/2008 | Simonnet et al. | |
| 8,582,584 B2 | 11/2013 | Rieger et al. | |
| 8,738,766 B1 | 5/2014 | Kazerani et al. | |
| 9,161,263 B2 | 10/2015 | Kakadia et al. | |
| 2008/0212961 A1* | 9/2008 | Zhang | G06F 15/161 398/25 |
| 2015/0249750 A1* | 9/2015 | Kakadia | H04M 15/805 455/406 |
| 2015/0295654 A1 | 10/2015 | Huang et al. | |
| 2015/0319626 A1 | 11/2015 | Yi et al. | |
| 2016/0014617 A1 | 1/2016 | Sofuoglu et al. | |
| 2017/0180942 A1* | 6/2017 | Smith | H04W 4/029 |

OTHER PUBLICATIONS

Sethi et al., "Network Technology Trend for Next-Generation Wireless Communication." IUP Journal of Telecommunications 8.2 (2016): 12. Retrieved on Jan. 10, 2017, 6 pages.

* cited by examiner

*Primary Examiner* — Wei Zhao
(74) *Attorney, Agent, or Firm* — Amin, Turocy & Watson, LLP

(57) ABSTRACT

Adaptation of a network is disclosed. A proposed adaptation, determined by a sub-network component of the network based on an intended effect to the sub-network, can be received by a network-level arbitration component. The network-level arbitration component can determine if the proposed adaptation satisfies a rule based on predicted results on the network from implementing the proposed adaptation. Where the rule is satisfied the adaptation can be implemented. A result of the implementation can be compared to the predicted results to determine if the network should be reverted to a pre-implementation state. In an aspect, the network-level arbitration component can be a core-network component. In an embodiment, the network-level arbitration component can be a virtualized component on a network provider server, a cloud server, etc.

20 Claims, 10 Drawing Sheets

ADAPTATION OF A NETWORK BASED ON A SUB-NETWORK DETERMINED ADAPTATION OF THE SUB-NETWORK

TECHNICAL FIELD

The disclosed subject matter relates to selection or implementation of network adaptations determined by and for sub-portions of the network, e.g., selection of locally determined sub-network adaptions applied at the network level in consideration of the effects on the overall network state.

BACKGROUND

Conventional network adaptation generally occurs either at the entire network level based on measurements sent to a network-level controller or at a local sub-network level without consideration of collateral effects on the overall network. As such, some implementations of conventional network adaptation technologies can result in complex analytical systems and much data transport to enable global network analysis, e.g., for centralized network adaptation schema. In other implementations of conventional network adaptation technologies, the local sub-network adaptation can impact the overall performance of the global network in undesirable ways. Alternative approaches to global network adaptation can become increasingly important as deployed network elements become increasingly heterogeneous and of finer grain in modern network topologies.

DETAILED DESCRIPTION

Figure 1:
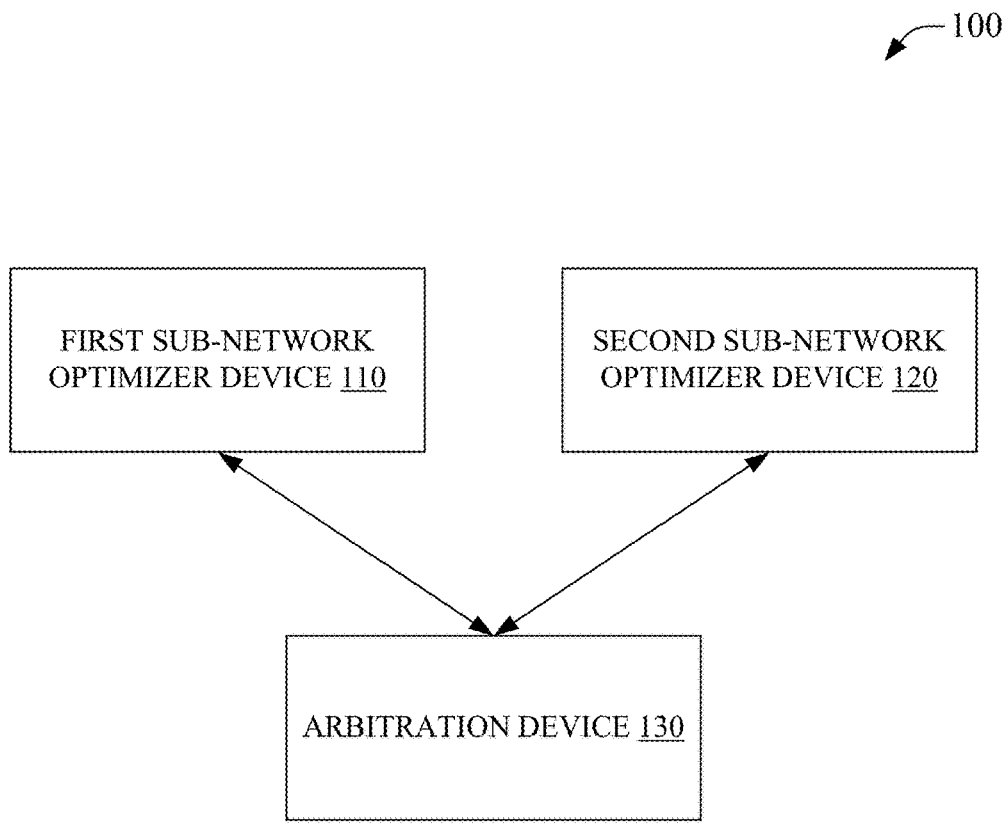
FIG. 1 is an illustration of an example system that can enable adaptation of a global network based on a sub-network determined adaptation, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Typically, some conventional network adaptations occur at the entire network level based on measurements sent to a network-level controller from across the entire network. As such, these types of implementations of conventional network adaptation technologies can result in complex analytical systems and corresponding data transport systems to enable global network analysis based on distant measurements from across the whole network, with the thought that managing the whole network provides the best end-to-end network despite the obvious costs of centralization of decision making for adaptations in large networks. In other conventional network adaptation technologies, adaptations are made at a local sub-network level without consideration of collateral effects on the overall network. In these conventional network adaptation technologies, the local sub-network adaptation is performed despite any collateral impact on the overall performance of the global network, with the thought that interconnected locally optimized sub-networks is likely to provide an optimized global network. As such, other approaches to global network adaptation can become increasingly important as deployed network elements become increasingly heterogeneous and of finer grain in modern network topologies.

In an aspect, the disclosed subject matter provides for end-to-end network management via adaption of the end-to-end network that is considerate of collateral effects of adaptions on the overall network. However, unlike conventional technologies, the disclosed subject matter provides that the adaptation of the network is based on proposed adaptations determined by a sub-network comprised in the network, e.g., the sub-networks making up the network can provide local solutions determined locally to a centralized component that can then predict a global impact of the proposed adaptations and allow implementation of a selected adaptation. The selection of an allowed implementation can be based on metrics that allow for ranking, scoring, or other ordering of one or more proposed adaptations received by the centralized component, e.g., the centralized component can determine based on a suitable metric, which, if any, adaptation to allow in view of the predicted effect of the adaptation on the overall network. Metrics can reflect business goals, regulations, efficiency, interoperability of network devices/systems, etc., or nearly any other relevant metric to enable comparatively evaluating different proposed adaptations to facilitate selection of a preferred course of action, e.g., allowing, initiating, or implementing one or more proposed adaptation preferential to other proposed adaptations. In an embodiment, the analysis, selection, initiation, etc., of a proposed adaptation from a sub-network component can be performed on a device of a core-network affiliated with a network provider identity, can be performed on a virtualized device, e.g., operating on a network of servers such as a cloud computing environment, etc. In some embodiments, the local determination of an adaptation, e.g., a proposed adaptation determined at a sub-network component for implementation on the sub-network of the end-to-end network, etc., can be based on measurements received by a local device, e.g., by the example sub-network component, etc. This can act to distribute analysis of sub-network measurements to the sub-network components while retaining centralized selection of an adaptation of the global network, e.g., via adaptation of the sub-network comprised in the network, which does not ignore collateral effects from implementing a local adaptation on the overall network. Examples of local network adaptations determined by a subnetwork and evaluated for effect on the end-to-end network can include, but are explicitly not limited to, changing routing of data through a subnetwork via, for example, an software deployed network (SDN) controller, etc.; modification of an antenna parameter, e.g., elevation, angle, azimuth, transmit power, etc.; load shifting or load balancing in the subnetwork; moving virtual applications to adapt a number of machines the virtual application instances are employing, e.g., virtual machine (VM) elasticity, etc.; or other such aspects. These aspects can be adapted on one or more various subnetworks e.g., 210, 220, 230, 240, etc., via a subnetwork analysis/optimizer, e.g., 110, 120, 310, 320, 410, 510-511, etc., of a network based on an evaluation of the effect of the adaptation by a network-level arbitration device, e.g., 130, 330, 430, 530-534, etc.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate adaptation of a global network based on a sub-network determined adaptation, in accordance with aspects of the subject disclosure. System 100 can comprise first sub-network optimizer device 110 and second sub-network optimizer device 120. A sub-network optimizer device, e.g., 110-120, etc., can receive measurements of characteristics of a local sub-network. As an example, where first sub-network optimizer device 110 is affiliated with radio access network (RAN) sub-network, a local measurement can be related to the operation, performance, etc., of the RAN sub-network. As such, the first sub-network optimizer device 110 can determine that an adaptation of the RAN sub-network can be beneficial to the operation of the RAN sub-network, e.g., lower power consumption, better subscriber experience, lower maintenance costs, extending mean time between failures (MTBFs), allowing use of lower cost or more readily available devices in the RAN sub-network, etc.

Similarly, the second sub-network optimizer device 120 can also determine local adaptations to a second sub-network affiliated with the second sub-network optimizer device 120. As an example, where second sub-network optimizer device 120 is affiliated with a transport sub-network, the second sub-network optimizer device 120 can determine adaptations of the transport sub-networks based on measurements related to the transport sub-network. In an aspect, a determined adaptation of a second sub-network by sub-network optimizer device 120 can be unrelated to considerations employed by the first sub-network optimizer device 110 in determining an adaptation of a corresponding first sub-network. In view of the immediate examples, aspects employed in determining a possible adaption of the RAN sub-network can be unrelated to aspects employed in determining a possible adaptation of the transport sub-network. It will be noted that the same measurement can, in some instances, be employed by either or both sub-network optimizer devices wherein that measurement is relevant to the corresponding sub-network. As an example, a count of UEs connected to a RAN sub-network can be used by both the first and second sub-network optimizer devices 110-120, where that count is independently relevant to possible adaptations of each of the RAN sub-network and the transport sub-network.

First sub-network optimizer device 110 and second sub-network optimizer device 120 can be communicatively coupled to arbitration device 130. Arbitration device 130 can be, in some embodiments, a centralized device. In some embodiments, arbitration device 130 can be a virtualized device. In certain environments, a virtualized arbitration device 130 can be implemented on a cloud server, on local servers, on servers that are remotely located from one another and coupled via a communication framework, etc. In some embodiments, a virtualized arbitration device 130 can be implemented on a server affiliated with a network provider identity. As examples, arbitration device 130 can be part of an enhanced packet core (EPC) device, can be a virtual device implemented on a server affiliated with a network provider entity, can be a virtual device distributed between a server affiliated with a network provider entity and another server, a virtual device implemented on a server of a cloud environment such as Microsoft Azure™, Amazon Web Services™ (AWS), Google Cloud Platform™, etc.

In an aspect, arbitration device 130 can receive a proposed adaptation of a sub-network, wherein the proposed adaptation has been determined by a device affiliated with the sub-network. In an embodiment, arbitration device 130 can receive a proposed adaptation from more than one sub-network. As such, arbitration device 130 can determine an effect on the network, e.g., the end-to-end network, of implementing a proposed adaptation received from a sub-network, e.g., via first sub-network optimizer devices 110, second sub-network optimizer devices 120, etc. Typically, the proposed adaptation can be determined to be an improvement to the sub-network, e.g., via first sub-network optimizer devices 110, second sub-network optimizer devices 120, etc., and arbitration device 130 can then determine which proposed adaption(s) offer improvements of the overall network. Arbitration device 130 can then initiate implementation of a selected proposed adaptation of the network, e.g., wherein the adaptation is typically performed at the sub-network that is part of the overall network. As such, where a proposed adaptation that can be beneficial to the sub-network is determined to be undesirable for the overall network, implementation of the proposed adaptation can be avoided.

In an aspect, determining the effect of the proposed adaptation can be predictive, e.g., the effect of the proposed adaption can be determined prior to implementation of the proposed adaptation. In some embodiments, a model of the network can be employed to study the anticipated effect of the proposed adaptation or permutations thereof. In some embodiments, machine learning can be employed to facilitate determining an effect on the network that can occur with implementation of a proposed adaptation. In some embodiments, historical data can be employed in determining an effect of implementation of a proposed adaptation. As an example, historical data relating to network performance, e.g., key performance indicators (KPIs), key capacity indicators (KCIs), etc., can be employed in a machine learning environment to correlate network performance correlated to network adaptations associated with incidences of large network events, such as parades, weather events, sporting events, etc., e.g., when a football game is played, how the network performs as a result of increasing a count of access points proximate to the football stadium can be analyzed and future sporting events can be associated with predicted best levels of added access points. As a result, where a RAN sub-network proposed an increase in access points in relation to an upcoming football game, the arbitration device 130 can determine, based on the machine learning and historical data, that the addition of a certain number of access points is likely to improve network performance at an acceptable cost and without overloading transport sub-network components. Accordingly, arbitration device 130 can initiate the addition of the predicted number of access points. Continuing the example, where the RAN sub-network suggests adding 20 times the preferred number of access points, arbitration device 130 can refuse the proposed adaptation; implement an amended proposed adaptation to a lower number of access points than originally recommended in the proposed adaptation; etc.

Figure 2:
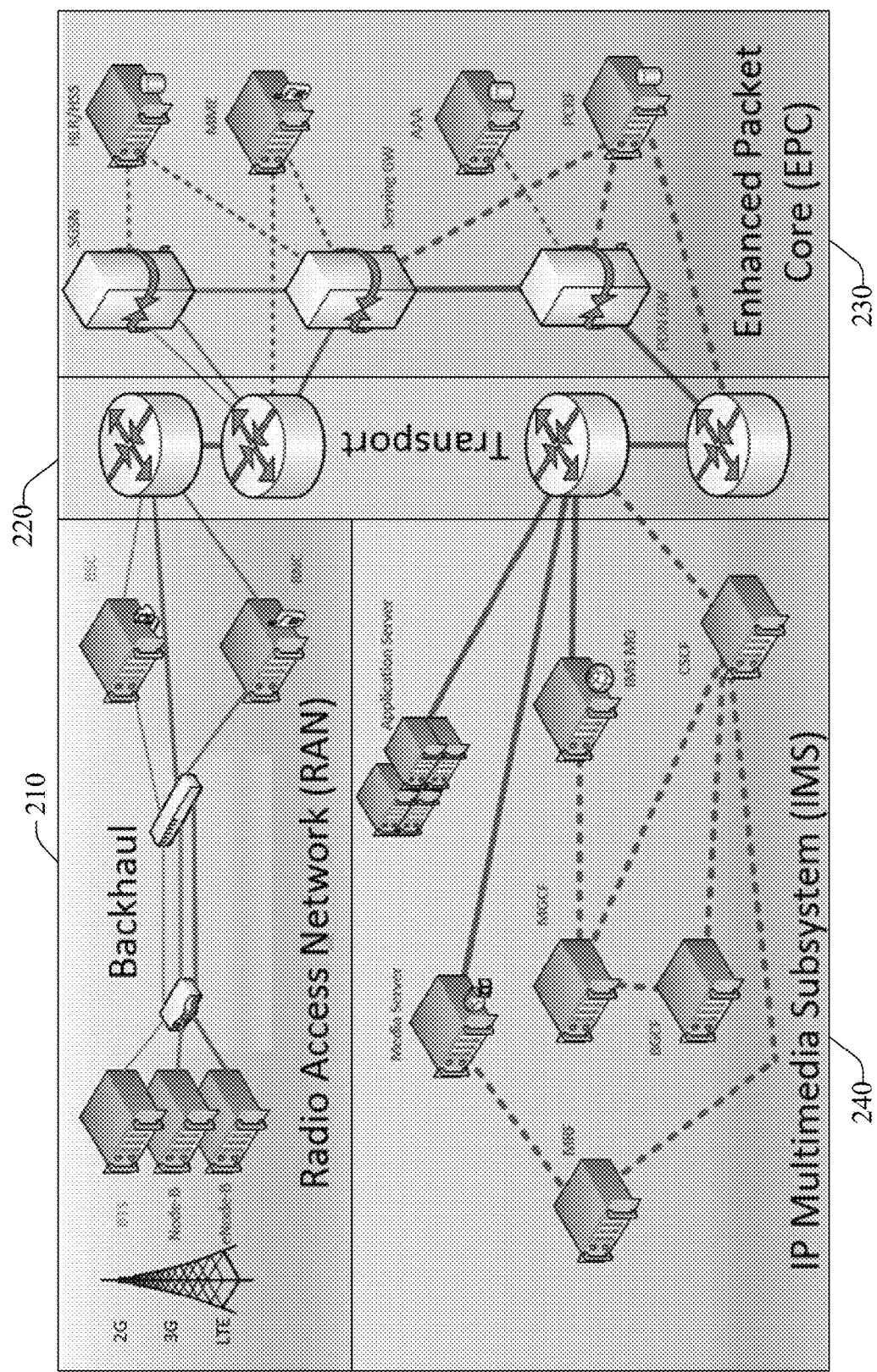
FIG. 2 is an illustration of an example system that can facilitate adaptation of a global network based on a sub-network determined adaptation for RAN, transport, EPC, and IMS sub-networks, in accordance with aspects of the subject disclosure.

FIG. 2 is an illustration of a system 200, which can facilitate adaptation of a global network based on a sub-network determined adaptation for RAN, transport, EPC, and IMS sub-networks, in accordance with aspects of the subject disclosure. System 200 can comprise for example, four sub-networks. These four example sub-networks can be RAN subnetwork 210, transport sub-network 220, EPC sub-network 230, internet protocol multimedia subsystem (IMS) sub-network 240, etc. In an embodiment, an arbitration device, e.g., 130, etc., can receive proposed network adaptation(s) from one or more of the sub-networks, e.g., 210-240, etc. As such, an arbitration device, e.g., 130, etc., can be determined if a proposed adaptation is to be implemented based on anticipated effects of the implementation on the end-to-end network. Whereas the proposed adaptation(s) are generally expected to be beneficial to the proposing sub-network, the arbitration device, e.g., 130, etc., can be selecting a best overall adaptation from adaptation(s) that are already good for parts of the overall network. The determination on proposed adaptation(s) by the sub-networks can free a centralized arbitration device from the onus of collecting network-wide measurements and determining proposed adaptations itself, which can allow the arbitration device to focus more directly on selecting from already determined network adaptations based on the overall effect expected on the network. This can improve the operation of the entire network itself, e.g., the proposed adaptation can improve the network operation, but also in that the disclosed subject matter reduces the computational load on a centralized network device by distributing local determination of proposed adaptations to the sub-networks to which the proposed adaption is relevant. This can result in faster decision making by the arbitration component, as compared to measuring an entire network and determining adaptations directly, can reduce the cost of the centralized arbitration device because it can have lower processing and/or memory requirements, etc., can reduce power consumption due to lower computational demand, and many more benefits to the network itself.

In some aspects, a proposed adaptation for a first sub-network, e.g., RAN sub-network 210, can be mutually beneficial to another sub-network, e.g., EPC sub-network 230. However, in some aspects, a proposed adaptation for a first sub-network, e.g., RAN sub-network 210, can be detrimental to another sub-network, e.g., transport sub-network 220. It will be noted that in some aspects, a proposed adaptation for a first sub-network, e.g., RAN sub-network 210, can be mutually beneficial to another sub-network, e.g., EPC sub-network 230, while also being detrimental to another sub-network, e.g., transport sub-network 220. As such, it can be undesirable to simply implement locally determined adaptations that do not consider collateral effects on the overall network. The disclosed subject matter can capture the benefits of locally determined proposed adaptations while it can also maintain control of implementation to protect the overall network itself.

Figure 3:
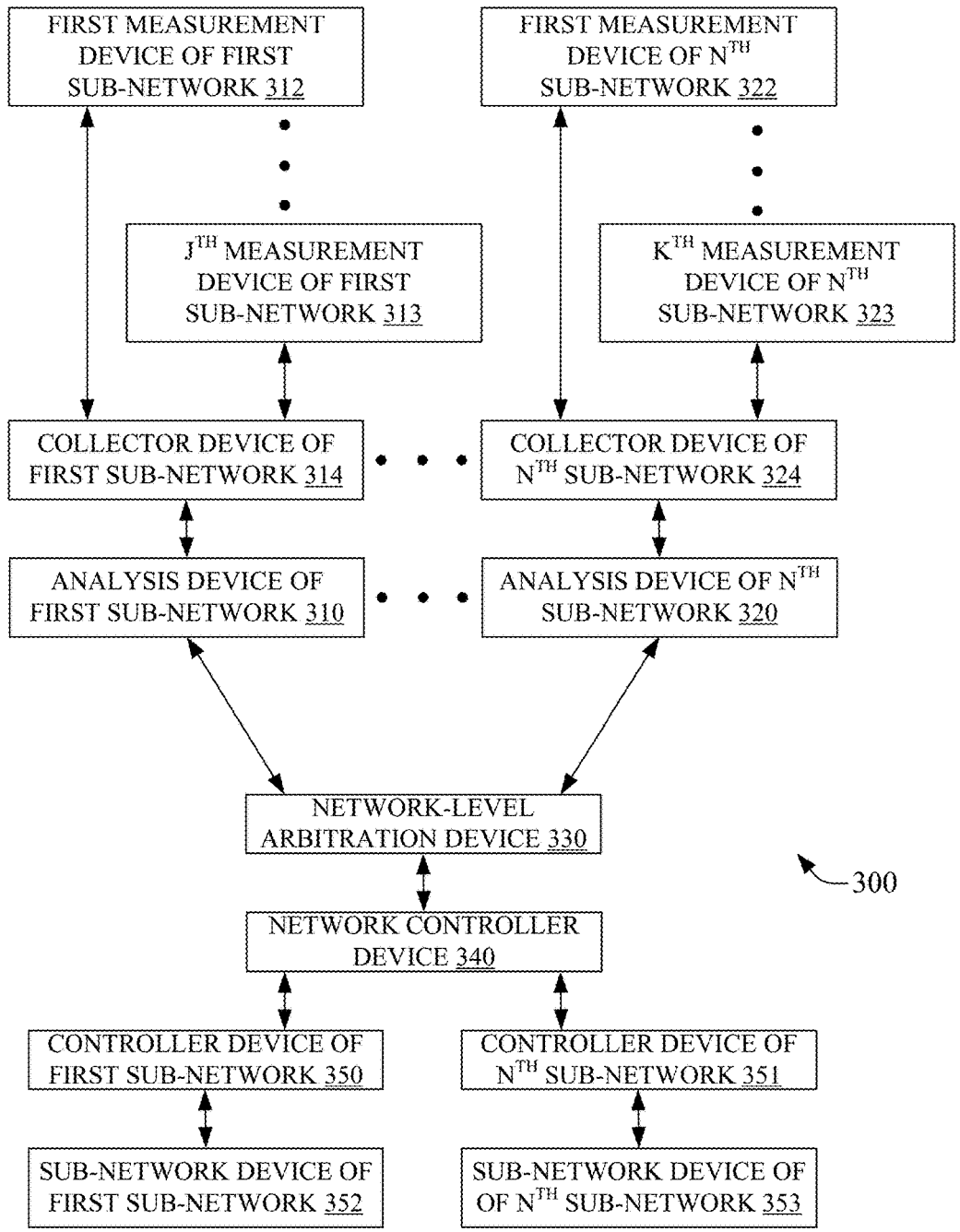
FIG. 3 is an illustration of an example system that can facilitate adaptation of a global network based on a sub-network determined adaptation for one to N sub-networks, in accordance with aspects of the subject disclosure.

FIG. 3 is an illustration of a system 300, which can facilitate adaptation of a global network based on a sub-network determined adaptation for one to N sub-networks, in accordance with aspects of the subject disclosure. System 300 can comprise analysis device of first sub-network 310. Analysis device of first sub-network 310 can receive measurements of characteristics of a local sub-network via collector device of first sub-network 314. Collector device of first sub-network 314 can interact with measurement devices, e.g., first measurement device of first sub-network 312 to $J^{th}$ measurement device of first sub-network 313), that capture measurements of aspects of the network typically corresponding to the sub-network.

Similarly, for an $N^{th}$ sub-network, system 300 can comprise analysis device of $N^{th}$ sub-network 320. Analysis device of $N^{th}$ sub-network 320 can receive measurements of characteristics of an $N^{th}$ sub-network via collector device of $N^{th}$ sub-network 324. Collector device of $N^{th}$ sub-network 324 can interact with measurement devices, e.g., first measurement device of $N^{th}$ sub-network 322 to $K^{th}$ measurement device of $N^{th}$ sub-network 323), that capture measurements of aspects of the network typically corresponding to the $N^{th}$ sub-network. As an example, where analysis device of $N^{th}$ sub-network 320 is affiliated with radio access network (RAN) sub-network, a measurement of the RAN sub-network can be related to the operation, performance, etc., of the RAN sub-network. As such, the analysis device of $N^{th}$ sub-network 320 can determine that an adaptation of the RAN sub-network based on the example measurement captured by $K^{th}$ measurement device 323 can be beneficial to the operation of the RAN sub-network.

Analysis device of first sub-network 310 and analysis device of $N^{th}$ sub-network 320 can be communicatively coupled to network-level arbitration device 330, wherein the network is comprised of the first to Nth sub-networks. Network-level arbitration device 330 can be, in some embodiments, a device of a core-network affiliated with a network provider identity. In some embodiments, network-level arbitration device 330 can be a virtualized device, e.g., implemented on a local server, a cloud server, on local servers, on servers that are remotely located from one another and coupled via a communication framework, etc.

In an aspect, network-level arbitration device 330 can receive a proposed adaptation of a sub-network, wherein the proposed adaptation has been determined by a device affiliated with the sub-network. In an embodiment, network-level arbitration device 330 can receive a proposed adaptation from more than one sub-network. As such, network-level arbitration device 330 can determine an effect on the network, e.g., the end-to-end network, of implementing a proposed adaptation received from a sub-network, e.g., via analysis device of first sub-network 310, analysis device of $N^{th}$ sub-network 320, etc. Typically, the proposed adaptation can be determined to be an improvement to the sub-network and network-level arbitration device 330 can then determine which proposed adaption(s) offer improvements to the overall network. Network-level arbitration device 330 can then initiate implementation of a selected proposed adaptation of the network, e.g., wherein the adaptation is typically performed at the sub-network that is part of the overall network. As such, where a proposed adaptation that can be beneficial to the sub-network is also determined to be acceptable for the overall network, implementation of the proposed adaptation can be initiated.

In an aspect, determining the effect of the proposed adaptation can be predictive, e.g., the effect of the proposed adaption can be determined prior to implementation of the proposed adaptation. In some embodiments, a model of the network can be employed to study the anticipated effect of the proposed adaptation or permutations thereof. In some embodiments, machine learning can be employed to facilitate determining an effect on the network that can occur with implementation of a proposed adaptation. In some embodiments, historical data can be employed in determining an effect of implementation of a proposed adaptation.

System 300 can further comprise network controller device 340 that can be communicatively coupled to network-level arbitration device 330. Network controller device 340 can undertake implementation of the initiated proposed network adaptation. In an aspect, network controller device 340, via controller devices of the sub-networks, e.g., controller device of first sub-network 350 to controller device of $N^{th}$ sub-network 351, can provision resources, generate signals/messages/instructions, etc., to implement the indicated proposed adaptation of the network. Correspondingly, sub-network device of first sub-network 352 to sub-network device of $N^{th}$ sub-network 353, can respond to their controller device to implement the proposed adaptation of the network at the appropriate sub-network elements.

Figure 4:
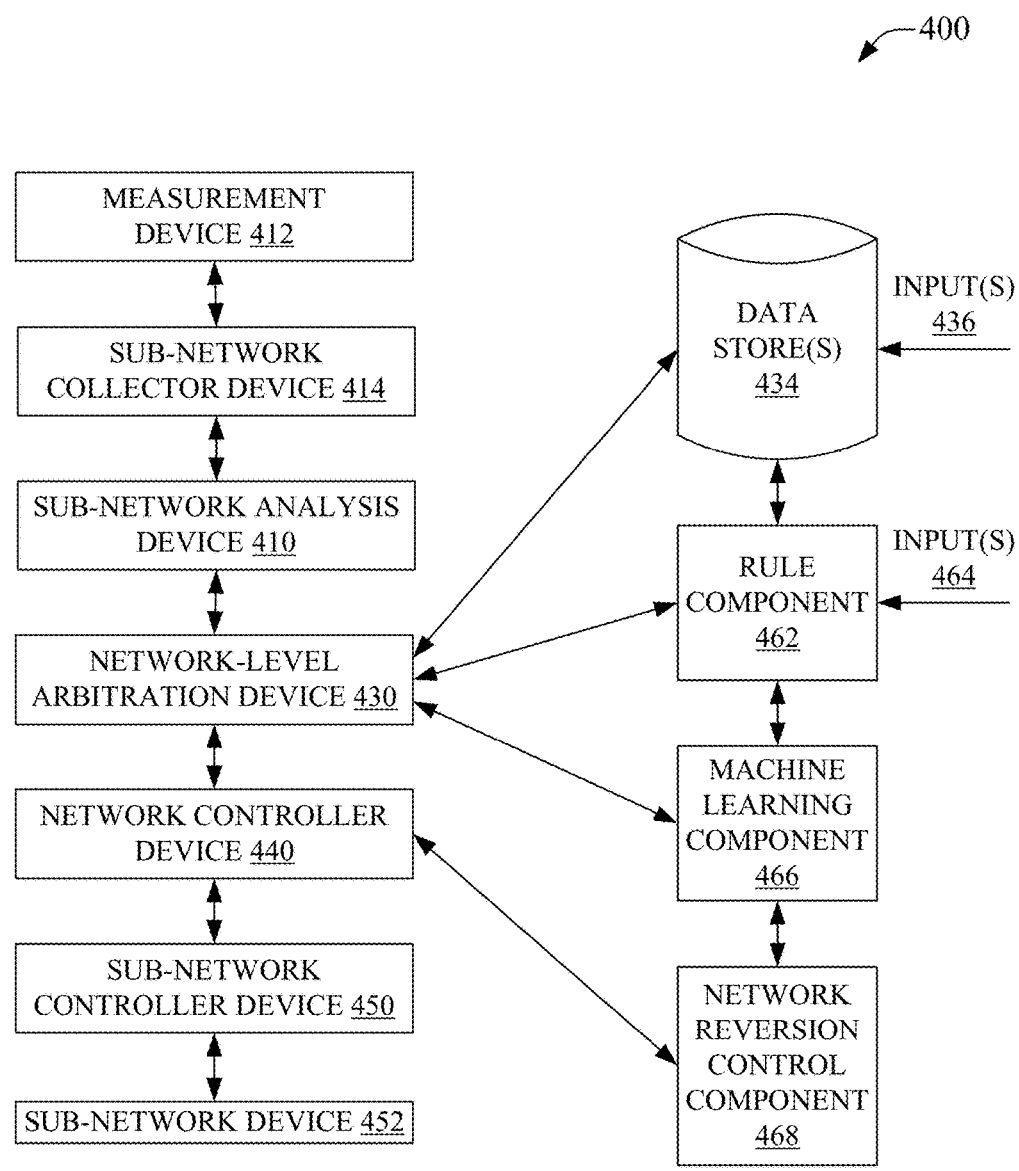
FIG. 4 illustrates an example system that can facilitate adaptation of a global network based on a sub-network determined adaptation based on updateable rules or machine learning technology, in accordance with aspects of the subject disclosure.

FIG. 4 is an illustration of a system 400, which can facilitate adaptation of a global network based on a sub-network determined adaptation based on updateable rules or machine learning technology, in accordance with aspects of the subject disclosure. System 400 can comprise sub-network analysis device 410. Sub-network analysis device 410 can receive measurements of characteristics of a local sub-network via sub-network collector device 414. Sub-network collector device 414 can interact with measurement devices, e.g., measurement device 412, which can capture a measurement of an aspect of the network typically corresponding to the sub-network.

Sub-network analysis device 410 can be communicatively coupled to network-level arbitration device 430. Network-level arbitration device 430 can, in some embodiments, be virtual components implemented on a device of a core-network affiliated with a network provider identity, on a local server, a cloud server, on a plurality of local servers, on servers that are remotely located from one another and coupled via a communication framework, etc. Network-level arbitration device 430 can receive a proposed adaptation of a sub-network from sub-network analysis device 410. In an embodiment, network level arbitration device 430 can receive a proposed adaptation from more than one sub-network. As such, network level arbitration device 430 can determine an effect on the network, e.g., the end-to-end network, of implementing a proposed adaptation received from a sub-network. Typically, the proposed adaptation can be determined to be an improvement to the sub-network and network level arbitration device 430 can then determine which proposed adaption(s) offer improvement(s) to the overall network. Network level arbitration device 430 can then initiate implementation of a selected proposed adaptation of the network. As such, where a proposed adaptation that can be beneficial to the sub-network is also determined to be acceptable for the overall network, implementation of the proposed adaptation can be initiated.

In an aspect, determining the effect of the proposed adaptation can be predictive, e.g., the effect of the proposed adaption can be determined prior to implementation of the proposed adaptation. In some embodiments, a model of the network can be employed to study the anticipated effect of the proposed adaptation or permutations thereof. In some embodiments, machine learning can be employed to facilitate determining an effect on the network that can occur with implementation of a proposed adaptation. In some embodiments, historical data can be employed in determining an effect of implementation of a proposed adaptation.

System 400 can further comprise network controller device 440 that can be communicatively coupled to network-level arbitration device 430. Network controller device 440 can undertake implementation of the initiated proposed network adaptation in response to a communication from network-level arbitration device 430. In an aspect, network controller device 440, via controller devices of the sub-networks, e.g., sub-network controller device 450, etc., can provision resources, generate signals/messages/instructions, etc., to implement the indicated proposed adaptation of the network. As such, sub-network device 452 can respond to sub-network controller device 450 to implement the proposed adaptation of the network at the appropriate and sub-network elements.

Network level arbitration device 430 can be communicatively coupled to data store(s) 434, which can receive input(s) 436. Data store(s) 434 can store data pertaining to selection of a proposed network adaptation, historical data, network states, etc., that can facilitate determining an expected result of implementing a proposed network adaptation. In some embodiments, data store 434 can comprise information enabling reversion to a previous network state, e.g., where an implemented network adaptation results in undesirable effects, reversion can be desirable and enabled by data stored on data store 434. Moreover, data store 434 can receive input(s) 436 that can comprise inputs causing storage of new data, deletion of existing data, modification of existing data, export of sore or all stored data, etc. In an aspect, input(s) 436 can facilitate external analysis of proposed adaptation selection processes, modification of proposed adaptation selection processes, etc.

Network level arbitration device 430 can be communicatively coupled to rule component 462 that can receive input(s) 434. Rule component 462 can generate, modify, or delete a rule(s) related to selection of proposed adaptation of a network. In an embodiment, rule component 462 can store a rule(s) on rule component 462. In some embodiments, rule component 462 can store a rule(s) on data store 434. In some embodiments, rule component 462 can store a rule(s) on network-level arbitration device 430. Input(s) 464 can be inputs related to generating, modifying, or deleting a rule(s) related to selection of proposed adaptation of a network. As an example, input(s) 464 can comprise an instruction to modify a rule corresponding to a maximum number of user equipments (UEs) allowed per RAN device in a RAN sub-network. This example input 464 can be employed by rule component 462 to generate a modification signal that can cause network-level arbitration device 430 to modify a corresponding rule. Accordingly, when network-level arbitration device 430 receives a proposed adaptation of the RAN network. It can be evaluated in view of the modified maximum number of UEs per RAN device.

Network level arbitration device 430 can be communicatively coupled to machine learning component 466. Machine learning component 466 can enable application of machine leaning technology to determining selection of a proposed network adaptation. In an aspect, machine learning component 466 can learn from training data, e.g., stored on data store(s) 434, etc., for example to learn to predict an effect of implementing a proposed adaptation, infer a consequent of adopting a proposed network adaptation, etc. Moreover, machine learning component 466 can be updated by monitoring decisions made by network-level arbitration device 430 and effects resulting therefrom.

Network level arbitration device 430 can be communicatively coupled to network reversion control component 468. Network reversion control component 468 can enable reversion of a network to a state prior to implementation of one or more proposed network adaptation(s). In an aspect, reversion data can be stored at network reversion control component 468, at data store(s) 434, etc. In an embodiment, network reversion control component 468 can monitor the results of an implementation of a proposed adaptation to determine if the implementation is adequately corresponding to the predicted results. Where the implementation is not adequately corresponding, the implementation can be halted and reversion can be initiated, the implementation can be allowed to continue to completion prior to initiating a reversion where the results are still non-compliant, etc.

Figure 5:
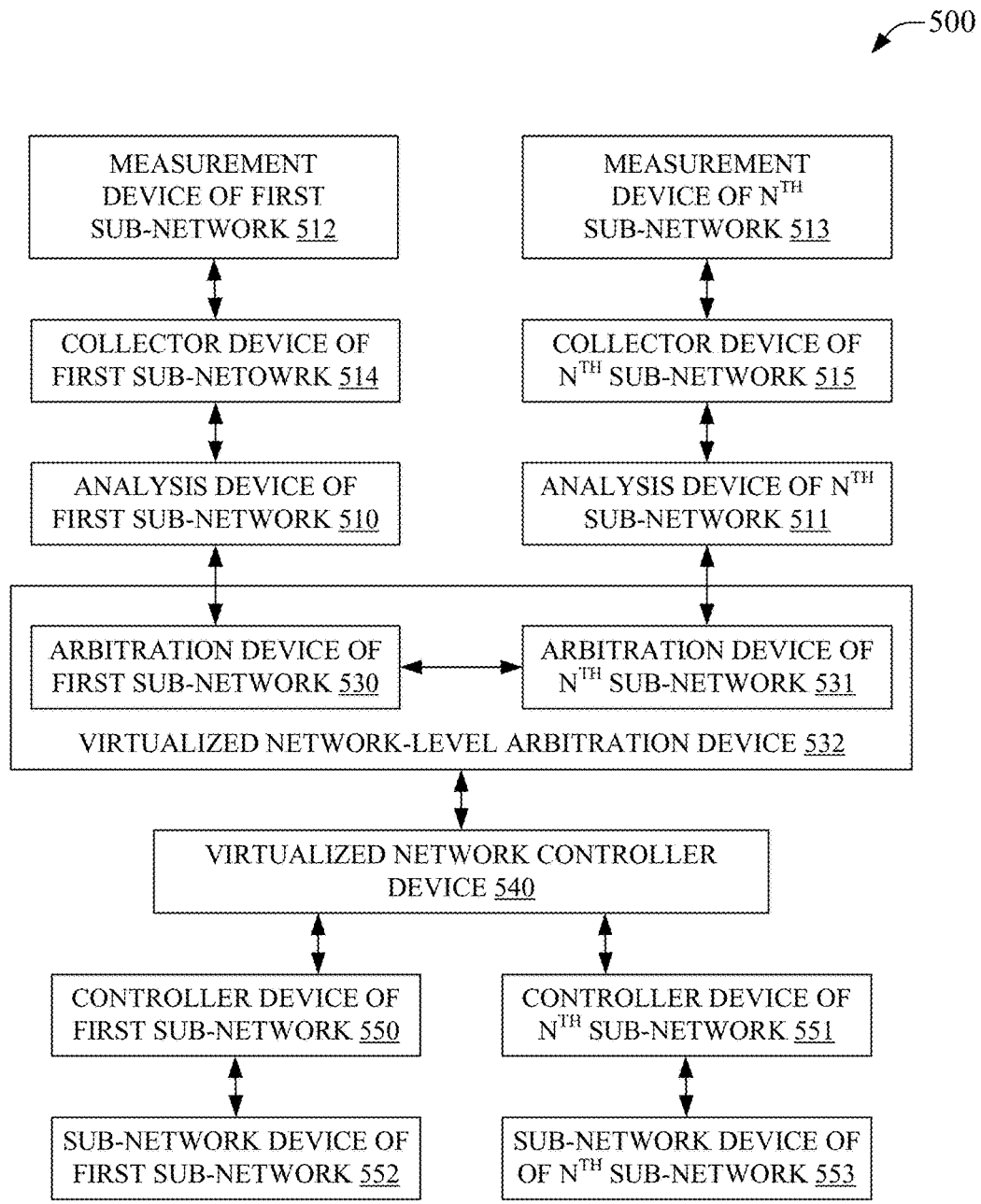
FIG. 5 is an illustration of an example system that can facilitate adaptation of a global network based on selection of a sub-network determined adaptation by a virtualized network-level component, in accordance with aspects of the subject disclosure.

FIG. 5 is an illustration of a system 500, which can facilitate adaptation of a global network based on selection of a sub-network determined adaptation by a virtualized network-level component, in accordance with aspects of the subject disclosure. System 500 can comprise analysis device of first sub-network 510. Analysis device of first sub-network 510 can receive measurements of characteristics of a local sub-network via collector device of first sub-network 514. Collector device of first sub-network 514 can interact with measurement devices, e.g., first measurement device of first sub-network 512, etc., that can capture a measurement of an aspect of the network typically corresponding to the sub-network.

Similarly, for an $N^{th}$ sub-network, system 500 can comprise analysis device of $N^{th}$ sub-network 511. Analysis device of $N^{th}$ sub-network 511 can receive measurements of characteristics of an $N^{th}$ sub-network via collector device of $N^{th}$ sub-network 515. Collector device of $N^{th}$ sub-network 515 can interact with measurement devices, e.g., first measurement device of $N^{th}$ sub-network 513, etc., that can capture a measurement of an aspect of the network typically corresponding to the $N^{th}$ sub-network. As an example, where analysis device of $N^{th}$ sub-network 511 is affiliated with radio access network (RAN) sub-network, a measurement of the RAN sub-network can be related to the operation, performance, etc., of the RAN sub-network. As such, the analysis device of $N^{th}$ sub-network 511 can determine that an adaptation of the RAN sub-network based on the example measurement captured by measurement device 513 and collected by collector device 515 can be beneficial to the operation of the RAN sub-network.

Analysis device of first sub-network 510 can be communicatively coupled to arbitration device of first sub-network 530 and analysis device of $N^{th}$ sub-network 511 can be communicatively coupled to arbitration device of the $N^{th}$ sub-network 531. Arbitration device of first sub-network 530 and arbitration device of the $N^{th}$ sub-network 531 can be virtual components of virtualized network level arbitration device 532. Virtualized network level arbitration device 532 can be, in some embodiments, implemented on a device of a core-network affiliated with a network provider identity. In some embodiments, virtualized network level arbitration device 532 can be implemented on a local server, a cloud server, on a plurality of local servers, on servers that are remotely located from one another and coupled via a communication framework, etc.

In an aspect, virtualized network level arbitration device 532 can receive, via arbitration device of first sub-network 530 to arbitration device of the $N^{th}$ sub-network 531, a proposed adaptation of a sub-network, wherein the proposed adaptation has been determined by a device affiliated with the sub-network, e.g., analysis device of first sub-network 510, analysis device of $N^{th}$ sub-network 511, etc. In an embodiment, virtualized network level arbitration device 532 can receive a proposed adaptation from more than one sub-network. As such, virtualized network level arbitration device 532 can determine an effect on the network, e.g., the end-to-end network, of implementing a proposed adaptation received from a sub-network. Typically, the proposed adaptation can be determined to be an improvement to the sub-network and virtualized network level arbitration device 532 can then determine which proposed adaption(s) offer improvements to the overall network. Virtualized network level arbitration device 532 can then initiate implementation of a selected proposed adaptation of the network. As such, where a proposed adaptation that can be beneficial to the sub-network is also determined to be acceptable for the overall network, implementation of the proposed adaptation can be initiated.

In an aspect, determining the effect of the proposed adaptation can be predictive, e.g., the effect of the proposed adaption can be determined prior to implementation of the proposed adaptation. In some embodiments, a model of the network can be employed to study the anticipated effect of the proposed adaptation or permutations thereof. In some embodiments, machine learning can be employed to facilitate determining an effect on the network that can occur with implementation of a proposed adaptation. In some embodiments, historical data can be employed in determining an effect of implementation of a proposed adaptation.

System 500 can further comprise virtualized network controller device 540 that can be communicatively coupled to virtualized network-level arbitration device 532. Virtualized network controller device 540 can undertake implementation of the initiated proposed network adaptation in response to a communication from virtualized network-level arbitration device 532. In an aspect, virtualized network controller device 540, via controller devices of the sub-networks, e.g., controller device of first sub-network 550 to controller device of $N^{th}$ sub-network 551, can provision resources, generate signals/messages/instructions, etc., to implement the indicated proposed adaptation of the network. As such, sub-network device of first sub-network 552 to sub-network device of $N^{th}$ sub-network 553 can respond to their corresponding controller device to implement the proposed adaptation of the network at the appropriate and corresponding sub-network elements.

Figure 6:
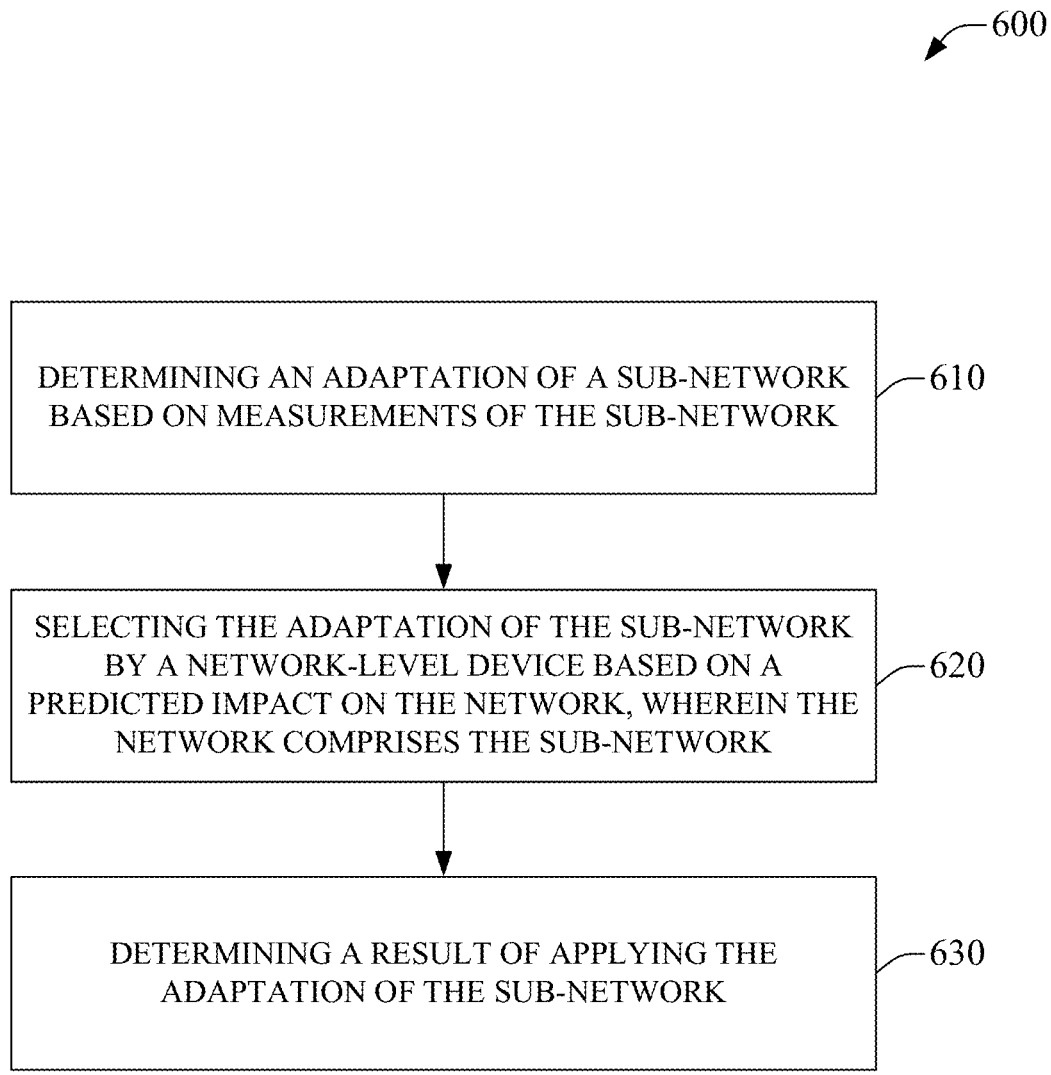
FIG. 6 illustrates an example method facilitating adaptation of a global network based on a sub-network determined adaptation, in accordance with aspects of the subject disclosure.
Figure 7:
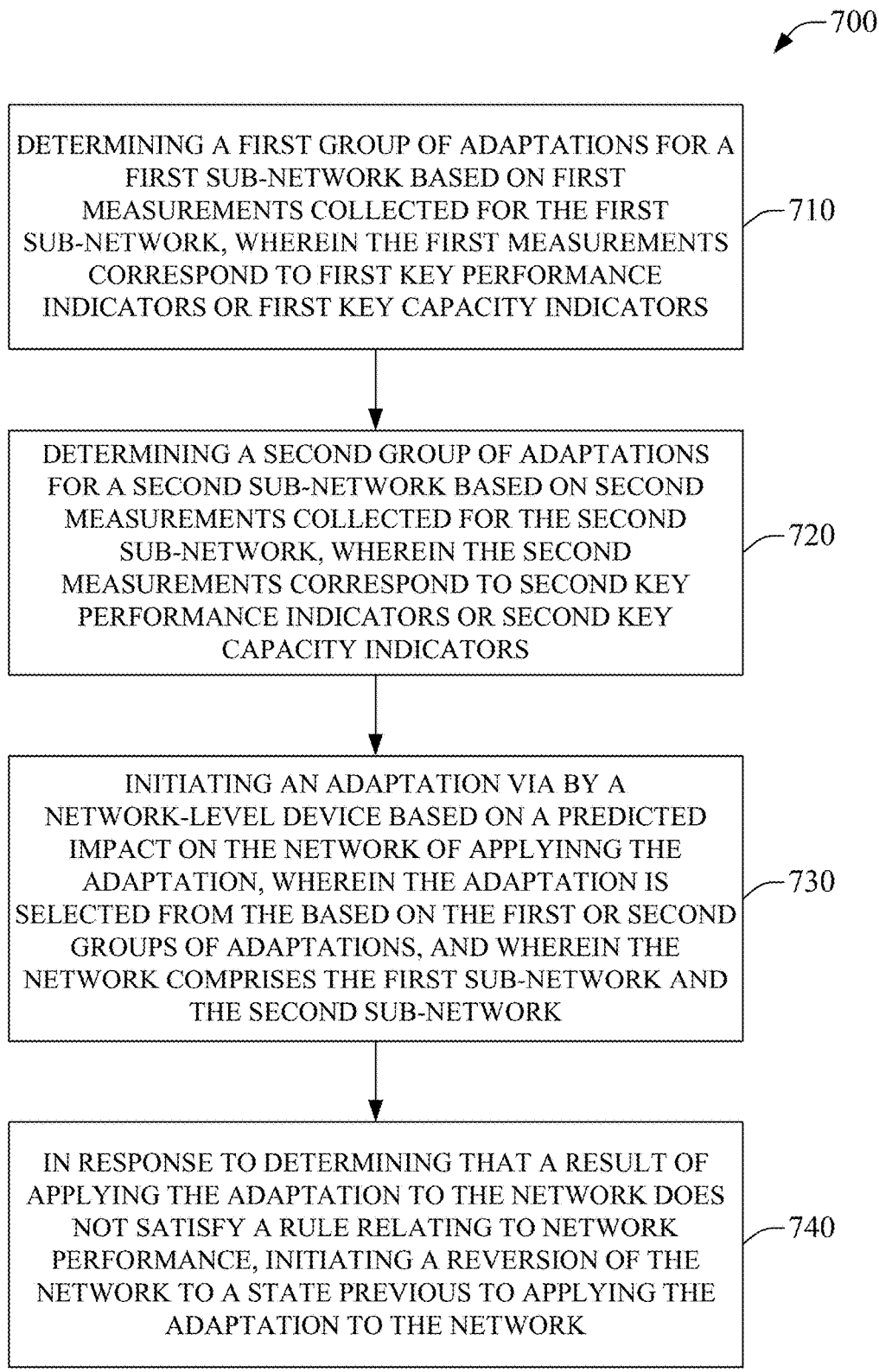
FIG. 7 illustrates an example method facilitating adaptation of a global network based on a sub-network determined adaptation with a reversion option, in accordance with aspects of the subject disclosure.
Figure 8:
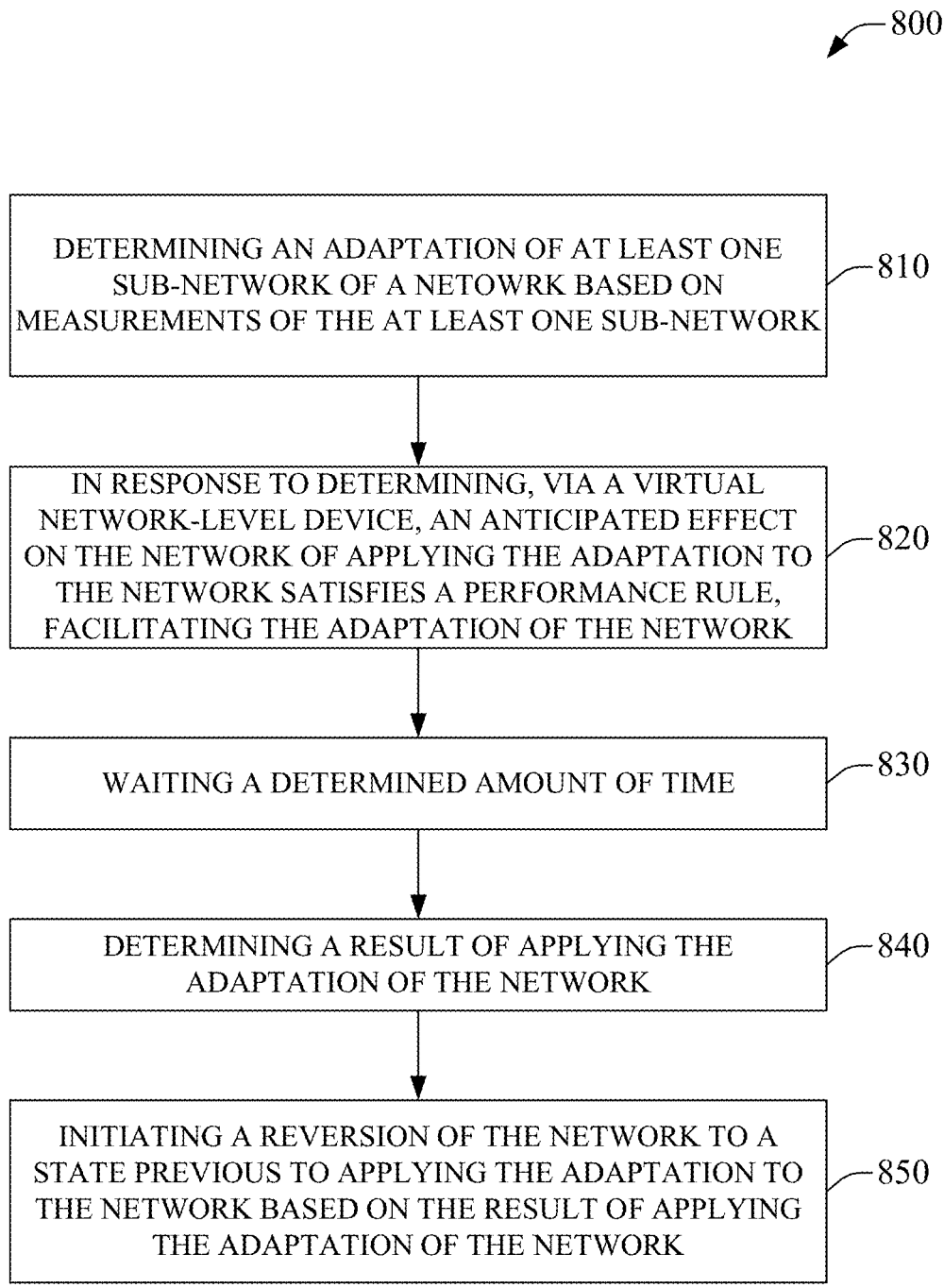
FIG. 8 illustrates an example method enabling adaptation of a global network based on selection of a sub-network determined adaptation by a virtualized network-level component, in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 is an illustration of an example method 600, which can facilitate adaptation of a global network based on a sub-network determined adaptation, in accordance with aspects of the subject disclosure. At 610, method 600 can comprise determining an adaptation of a sub-network based on measurements of the sub-network. Measurements of characteristics of the sub-network can be captured by a measurement device, e.g., 312-313, 322-323, 412, 512-513, etc. The measurements can be collected for the sub-network from the measurement devices via a collector device, e.g., 314, 324, 414, 514, 515, etc. The measurements can be employed in determining a local adaptation of the sub-network, e.g., without consideration of effects that the adaptation might have on the end-to-end network if the adaption were implemented. The adaptation can be collected with any other adaptations as potential adaptations and can be made available for further analysis, e.g., via a centralized arbitration device, etc., for selection based on their effect on the overall network, e.g., a network comprising the sub-networks corresponding to the proposed adaptation(s).

At 620, method 600 can comprise, selecting the adaptation of the sub-rework based on a predicted impact on the overall network. In an aspect, the selection can be performed by a network-level device and the network can comprise the sub-network. In an embodiment, the network-level device can be arbitration device 130, 330, 430, 532, etc., and can be, in some embodiments, implemented on a device of a core-network affiliated with a network provider identity, a local server, a cloud server, on local servers, on servers that are remotely located from one another and coupled via a communication framework, etc.

In an aspect, the network-level device can receive a proposed adaptation of a sub-network, wherein the proposed adaptation has been determined by a device affiliated with the sub-network. In an embodiment, the network-level device can receive a proposed adaptation from more than one sub-network. As such, the network-level device can determine an effect on the network, e.g., the end-to-end network, of implementing a proposed adaptation received from a sub-network. Typically, the proposed adaptation can be determined to be an improvement to the sub-network and the network-level device can then determine which proposed adaption(s) offer improvements to the overall network or are otherwise acceptable for implementation. The network-level device can then initiate implementation of a selected proposed adaptation of the network, e.g., wherein the adaptation is typically performed at the sub-network that is part of the overall network. As such, where a proposed adaptation that can be beneficial to the sub-network is also determined to be acceptable for the overall network, implementation of the proposed adaptation can be initiated.

In an aspect, determining the effect of the proposed adaptation can be predictive, e.g., the effect of the proposed adaption can be determined prior to implementation of the proposed adaptation. In some embodiments, a model of the network can be employed to study the anticipated effect of the proposed adaptation or permutations thereof. In some embodiments, machine learning can be employed to facilitate determining an effect on the network that can occur with implementation of a proposed adaptation. In some embodiments, historical data can be employed in determining an effect of implementation of a proposed adaptation.

At 630, method 600 can comprise, determining a result of applying the adaptation of the sub-network. At this point method 600 can end. In an embodiment, the prediction as to the effect of implementation of the adaptation to the network can be compared to results of actually implementing the adaptation. This can enable learning behaviors, e.g., machine learning, etc., to be improved in regard to future predictions. Moreover, this can enable determining if the results are acceptable and should be maintained or the network should be reverted to the pre-implementation state.

FIG. 7 illustrates example method 700 that facilitates adaptation of a global network based on a sub-network determined adaptation with a reversion option, in accordance with aspects of the subject disclosure. Method 700, at 710, can comprise, determining a first group of adaptations for a first sub-network based on first measurements collected for the first sub-network. Measurements can be of characteristics of the first sub-network and can be captured by measurement device(s), e.g., 312-313, 322-323, 412, 512-513, etc., of the first sub-network. The measurements can correspond to, or enable determining of, KPIs, KCIs, etc. The measurements can be collected for the sub-network from the measurement devices via a collector device, e.g., 314, 324, 414, 514, 515, etc. The measurements can be employed in determining a local adaptation of the sub-network, e.g., without consideration of effects that the adaptation(s) might have on the end-to-end network if the adaption were implemented. The adaptation(s) can be made available for further analysis, e.g., via a centralized arbitration device, etc., for selection therefrom based on an expected effect of a proposed adaptation on the overall network, e.g., a network comprising the sub-networks corresponding to the proposed adaptation(s).

Similarly, at 720, method 700 can comprise, determining a second group of adaptations for a second sub-network based on second measurements collected for the second sub-network. The second measurements can be of characteristics of the second sub-network. The second measurements can correspond to, or enable determining of, other KPIs, KCIs, etc. The second measurements can be collected for the second sub-network from measurement devices via a collector device, e.g., 314, 324, 414, 514, 515, etc., of the second sub-network. The second measurements can be employed in determining a local adaptation of the second sub-network, e.g., without consideration of effects that the adaptation(s) might have on the end-to-end network if the adaption were implemented at the second sub-network. The adaptation(s) can be made available for further analysis, e.g., via a centralized arbitration device, etc., for selection therefrom based on an expected effect of a proposed adaptation on the overall network, e.g., a network comprising the second sub-network corresponding to the proposed adaptation(s).

At 730, method 700 can comprise, initiating an adaptation via a network-level device based on a predicted impact on the overall network. In an aspect, the adaptation can be selected from, or be based on, the first or second groups of adaptations. In an aspect, the network can comprise the corresponding sub-networks. In an embodiment, the network-level device can be arbitration device 130, 330, 430, 532, etc., and can be, in some embodiments, implemented on a device of a core-network affiliated with a network provider identity, a local server, a cloud server, on local servers, on servers that are remotely located from one another and coupled via a communication framework, etc.

In an aspect, the network-level device can receive the groups of adaptations, e.g., the first and second groups of adaptations, comprising proposed adaptations that have been determined by a device affiliated with a corresponding sub-network. In an embodiment, the network-level device can receive groups of adaptations from more than one sub-network. As such, the network-level device can determine an effect on the network of one or more proposed adaptation. Typically, a proposed adaptation of the groups of adaptations can be determined to be an improvement to the corresponding sub-network, such that the network-level device can then determine which proposed adaption(s) of the groups of adaptations also is acceptable to the operation of the overall network. The network-level device can then initiate implementation of a selected proposed adaptation selected from the groups of adaptations or based on an adaptation of a proposed adaption of the groups of adaptations. As such, where a proposed adaptation that can be beneficial to the sub-network is also determined to be acceptable for the overall network, implementation of the proposed adaptation can be initiated.

In an aspect, determining the effect of the proposed adaptation can be predictive, e.g., the effect of the proposed adaption can be determined prior to implementation of the proposed adaptation. In some embodiments, a model of the network can be employed to study the anticipated effect of the proposed adaptation or permutations thereof. In some embodiments, machine learning can be employed to facilitate determining an effect on the network that can occur with implementation of a proposed adaptation. In some embodiments, historical data can be employed in determining an effect of implementation of a proposed adaptation.

At 740, method 700 can comprise, determining a result of applying the adaptation of the sub-network. In response to the determined result not satisfying a rule relating to network performance, a reversion can be initiated. At this point method 700 can end. The reversion can revert the network to a state prior to implementation of the adaptation. In an embodiment, the predicted effect of implementation of the adaptation to the network can be compared to results of actually implementing the adaptation. This can enable learning behaviors, e.g., machine learning, etc., to be improved in regard to future predictions. Moreover, this can enable determining if the results are acceptable and should be maintained or the network should be reverted to the pre-implementation state. Where the results are not acceptable, method 700 can initiate reversion to a prior acceptable network state. In an aspect, though not illustrated, delays can be included in method 700 to allow implementations to settle into a steady state prior to determining if reversion should occur. Moreover, timing delays can be employed to delay additional changes after a reversion to allow the network to go into equilibrium prior to potentially implementing other adaptations.

FIG. 8 illustrates example method 800 facilitating adaptation of a global network based on selection of a sub-network determined adaptation by a virtualized network-level component, in accordance with aspects of the subject disclosure. Method 800, at 810, can comprise determining an adaptation of at least one sub-network of a network. The adaptation can be based on measurements collected for the at least one sub-network. Measurements can be of characteristics of the at least one sub-network and can be captured by measurement device(s), e.g., 312-313, 322-323, 412, 512-513, etc., of the at least one sub-network. The measurements can correspond to, or enable determining of, KPIs, KCIs, etc. The measurements can be collected for the at least one sub-network from the measurement devices via a collector device, e.g., 314, 324, 414, 514, 515, etc. The measurements can be employed in determining a local adaptation of the at least one sub-network, e.g., without consideration of effects that the adaptation(s) might have on the end-to-end network if the adaption were implemented. The adaptation(s) can be made available for further analysis, e.g., via a centralized arbitration device, etc., for selection therefrom based on an expected effect of a proposed adaptation on the overall network, e.g., a network comprising the sub-networks corresponding to the proposed adaptation(s).

At 820, in response to determining, via a virtual network-level device, that an anticipated effect of applying the adaptation satisfies a performance rule, method 800 can comprise, facilitating adaptation of the network. In an aspect, the adaptation can be selected from, or be based on, the adaptation of the at least one sub-network. In an aspect, the network can comprise corresponding sub-networks of the least one sub-network. In an embodiment, the virtual network-level device can be arbitration device 130, 330, 430, 532, etc., and can be, in some embodiments, virtualized on a device of a core-network affiliated with a network provider identity, a local server, a cloud server, on local servers, on servers that are remotely located from one another and coupled via a communication framework, etc.

In an aspect, the virtual network-level device can receive the adaptation of the at least one sub-network. In an embodiment, the network-level device can receive adaptations from more than one sub-network. As such, the network-level device can determine an effect on the network of one or more proposed adaptation. Typically, a proposed adaptation can be determined to be an improvement to the corresponding sub-network, such that the virtual network-level device can then determine which proposed adaption(s) is acceptable to the operation of the overall network. The virtual network-level device can then initiate implementation of the adaptation. As such, where an adaptation that can be beneficial to the sub-network and also is determined to be acceptable for the overall network, implementation of the proposed adaptation can be initiated.

In an aspect, determining the effect of the adaptation can be predictive, e.g., the effect of the proposed adaption can be determined prior to implementation of the proposed adaptation. In some embodiments, a model of the network can be employed to study the anticipated effect of the proposed adaptation, or permutations thereof. In some embodiments, machine learning can be employed to facilitate determining an effect on the network that can occur with implementation of a proposed adaptation. In some embodiments, historical data can be employed in determining an effect of implementation of a proposed adaptation.

At 830, method 800 can wait a determined amount of time, which can allow effects caused by the adaptation to the network to settle. At 840, method 800 can comprise, determining a result of applying the adaptation of the sub-network. In response to the determined result not satisfying a rule relating to network performance, a reversion can be initiated.

At 850, the reversion can be imitated for the network. At this point method 800 can end. The reversion can be initiated based on the result of applying the adaptation to the network. Moreover, the reversion can place the network into a state that existed prior to implementation of the adaptation. In an embodiment, the predicted effect of implementation of the adaptation to the network can be compared to results of actually implementing the adaptation. This can enable learning behaviors, e.g., machine learning, etc., to be improved in regard to future predictions. Moreover, this can enable determining if the results are acceptable and should be maintained or the network should be reverted to the pre-implementation state. Where the results are not acceptable, method 800 can initiate reversion to a prior acceptable network state. In an aspect, though not illustrated, other waiting period can be employed to delay additional changes to the network after a reversion, which can allow the network to go into equilibrium after reversion and prior to potentially implementing other adaptations.

Figure 9:
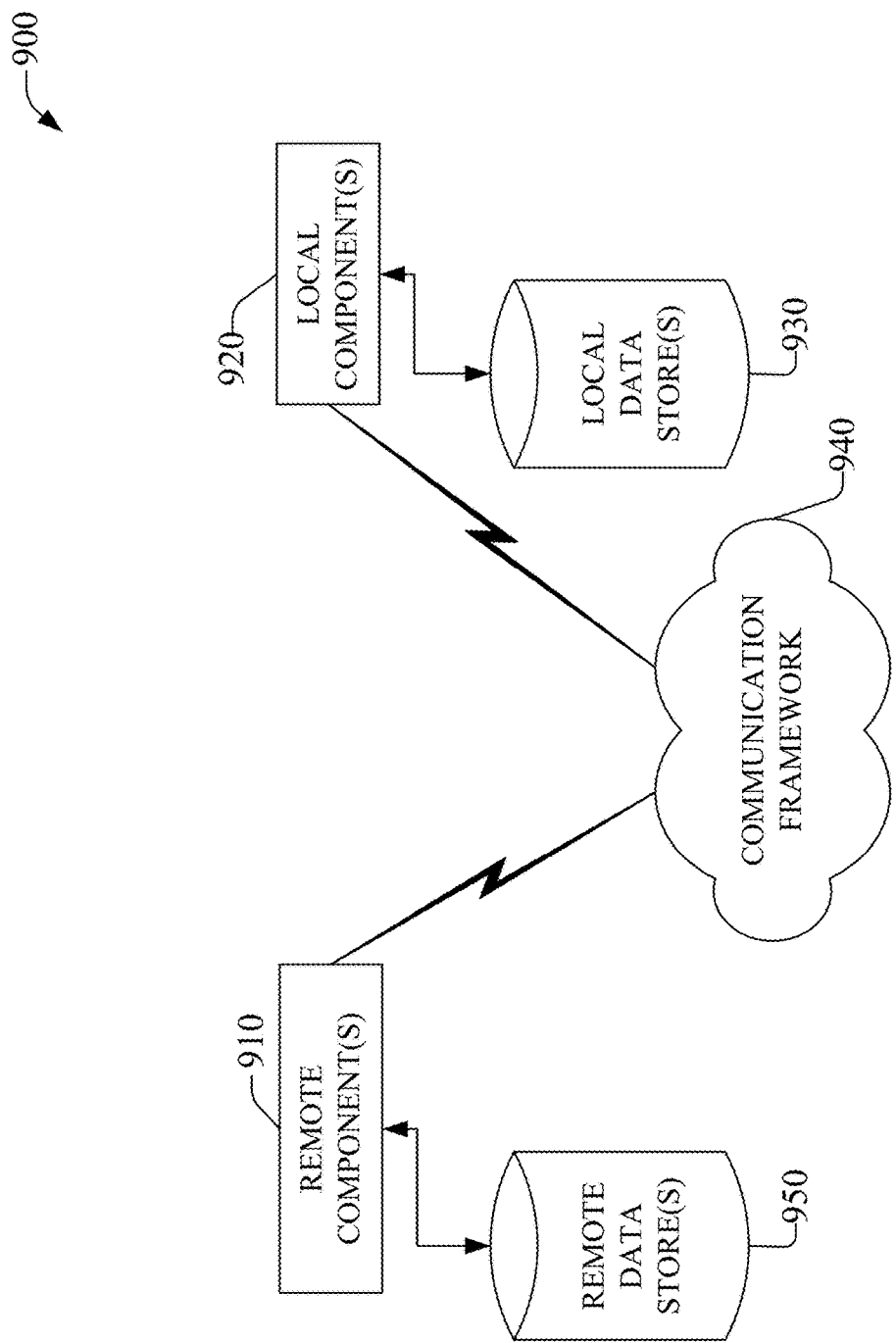
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can core network devices associated with a network provider identity, can be a sub-network device(s), e.g., 110, 120, 312-313, 314, 310, 322-323, 324, 320, 412, 414, 410, 510-515, data store(s) 434, rule component 462, machine learning component 466, network reversion control component 468, sub-network controller devices 350, 351, 450, etc., a device generating input(s) 436, 464, etc.

The system 900 also comprises one or more local component(s) 920. The local component(s) 920 can be hardware and/or software (e.g., threads, processes, computing devices). In some embodiments, local component(s) 920 can comprise arbitration device 130, 330, 430, 530-532, network controller device 340, 540, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As examples, historical use data, user input(s), etc., can be stored on remote data store(s) 434, etc., that can be coupled to a network-level arbitration device, e.g., 130, 330, 430, 530-532, etc.

Figure 10:
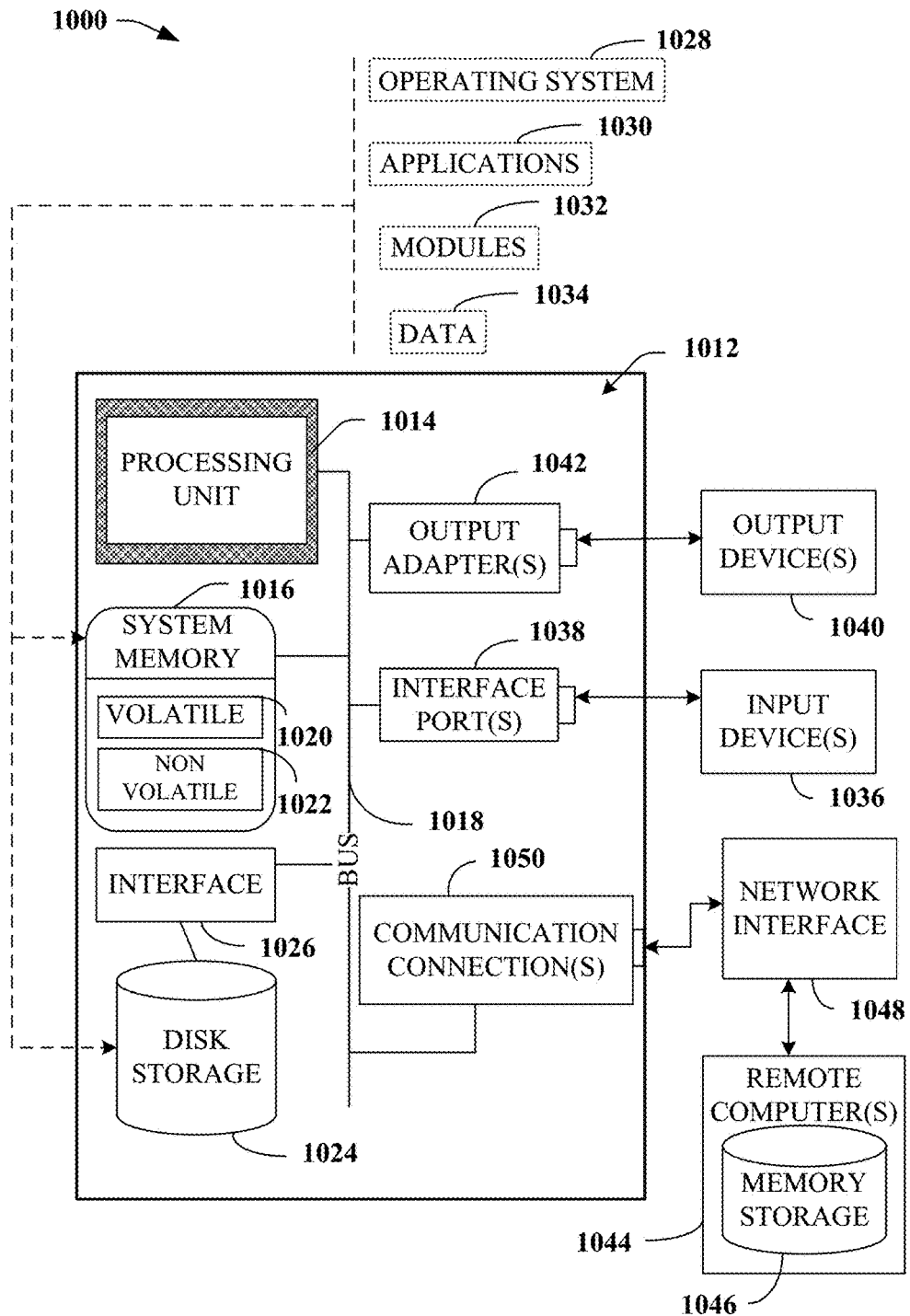
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, sub-network device(s), e.g., 110, 120, 312-313, 314, 310, 322-323, 324, 320, 412, 414, 410, 510-515, data store(s) 434, rule component 462, machine learning component 466, network reversion control component 468, sub-network controller devices 350, 351, 450, etc., a device generating input(s) 436, 464, etc., arbitration device 130, 330, 430, 530-532, network controller device 340, 540, etc., can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising determining, by arbitration device, e.g., 130, 330, 430, 530-532, a proposed network adaptation based on selection rules stored in a rule component, e.g., rule component 462, etc.; implementing the adaptation; determining a result of the implementation; and reverting the network where the result does not satisfy a rule relating to network performance.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., an first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows. Data or signal information exchange can comprise technology, such as, single user (SU) multiple-input and multiple-output (MIMO) (SU MIMO) radio(s), multiple user (MU) MIMO (MU MIMO) radio(s), long-term evolution (LTE), LTE time-division duplexing (TDD), global system for mobile communications (GSM), GSM EDGE Radio Access Network (GERAN), Wi Fi, WLAN, WiMax, CDMA2000, LTE new radio-access technology (LTE-NX), massive MIMO systems, etc.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A network device, comprising:
    a processor; and
    a memory that stores executable instructions that, when executed by the processor, facilitate performance of operations, comprising:
        determining a first performance adaptation for a first network segment of network segments of a network;
        determining a first expected effect on a performance of the network segments of the network based on the first performance adaptation;
        initiating an implementation of the first performance adaptation based on the first expected effect on the performance of the network segments of the network;
        determining a second performance adaptation for the first network segment;
        determining a second expected effect on the performance of the network segments of the network based on the second performance adaptation; and
        in response to determining that the implementation is to be rejected based on a result of comparing the implementation to the second expected effect on the performance of the network segments, reverting the first network segment to a state prior to the initiating the implementation of the first performance adaptation.

2. The network device of claim 1, wherein
    the initiating the implementation of the first performance adaptation is based on the first expected effect being determined to rank higher than the second expected effect.

3. The network device of claim 2, wherein the operations further comprise:
    adjusting a first score for the first performance adaptation based on the first expected effect being determined to satisfy a first network performance rule related to an anticipated change in the performance of the network segments of the network resulting from the implementation of the first performance adaptation at the first network segment.

4. The network device of claim 1, wherein the operations further comprise:
    determining a third performance adaptation for a second network segment of the network segments; and
    determining a third expected effect on the performance of the network segments of the network based on the third performance adaptation, wherein the initiating the implementation of the first performance adaptation is based on the first expected effect being determined to rank higher than the third expected effect.

5. The network device of claim 1, wherein a network segment, selected from the network segments, is an evolved packet core network segment comprising devices corresponding to an evolved packet core portion of a telecommunications network.

6. The network device of claim 1, wherein a network segment, selected from the network segments, is a backhaul network segment comprising devices corresponding to a backhaul portion of a telecommunications network.

7. The network device of claim 1, wherein a network segment, selected from the network segments, is a transport segment comprising devices corresponding to a transport portion of a telecommunications network.

8. The network device of claim 1, wherein a network segment, selected from the network segments, is an internet protocol multimedia system network segment comprising devices corresponding to an internet protocol multimedia system portion of a telecommunications network.

9. The network device of claim 1, wherein a network segment, selected from the network segments, is a radio access network network-segment comprising devices corresponding to a radio access network portion of a telecommunications network, and wherein, in response to the network segment being determined to be the first network segment, the first performance adaptation comprises adapting an antenna parameter selected from a group of antenna parameters comprising elevation, azimuth, and transmit power, for an antenna of the radio access network portion of the telecommunications network.

10. The network device of claim 1, wherein the network device is a virtual network device implemented on servers affiliated with a cloud network provider identity.

11. A method, comprising:
receiving, by a system comprising a processor, a first proposed modification of a network of devices, wherein the network of devices comprises a sub-network of devices comprising fewer devices than the network of devices, wherein the first proposed modification is indicated to the system by a device of the sub-network of devices, and wherein the first proposed modification is associated with a performance of the sub-network of devices;
determining, by the system, a first anticipated effect, on the network of devices, of implementing the first proposed modification;
rank ordering, by the system, the first proposed modification among proposed modifications based on the first anticipated effect;
according to a first result of the rank ordering, facilitating, by the system, an implementation of a ranked proposed modification of the proposed modifications;
determining, by the system, a second result of the implementation of the ranked proposed modification;
determining, by the system, whether the implementation is to be retained based on comparing the second result to a second anticipated effect of the implementation of the ranked proposed modification; and
in response to the implementation being determined not to be retained, reverting the network of devices to a state prior to the facilitating the implementation of the ranked proposed modification.

12. The method of claim 11, wherein the first proposed modification is associated with the performance of data transport devices affiliated with a transport sub-network.

13. The method of claim 11, wherein the first proposed modification is associated with the performance of radio access network devices.

14. The method of claim 11, wherein the system is a virtual device implemented on a server affiliated with a cloud network provider identity.

15. A non-transitory machine-readable storage medium, comprising executable instructions that, when executed by a processor, facilitate performance of operations, comprising:
receiving a proposed modification of network devices of a network determined by a device of a group of the network devices, wherein the network devices are greater in number than the group of the network devices;
initiating a first adaptation of the network devices based on a first anticipated effect of the proposed modification of the network devices;
determining a result of implementation of the first adaptation of the network devices; and
in response to determining, based on comparing the result to a second anticipated effect of the proposed modification, that the result of the implementation of the first adaptation of the network devices has not satisfied a network performance metric associated with the second anticipated effect of the proposed modification initiating a reversion to a network state previous to the initiating the first adaptation of the network devices.

16. The non-transitory machine-readable storage medium of claim 15, wherein:
the initiating the first adaptation of the network devices is further based on the first anticipated effect of the proposed modification of the network devices scoring higher than the second anticipated effect of the proposed modification to the network devices.

17. The non-transitory machine-readable storage medium of claim 15, wherein the executable instructions are executed by the processor of a server device affiliated with a cloud network provider identity.

18. The non-transitory machine-readable storage medium of claim 15, wherein the executable instructions are executed by the processor of a core-network device affiliated with a network provider identity.

19. The non-transitory machine-readable storage medium of claim 15, wherein the initiating the first adaptation of the network devices based on the first anticipated effect comprises determining an inference related to the first anticipated effect.

20. The method of claim 11, wherein the system is comprised in a core-network device affiliated with a network provider identity.

* * * * *